Sept. 9, 1969  G. S. TAKAMOTO  3,465,468
RADIANT ENERGY INSECT TRAP
Filed April 28, 1967

INVENTOR.
GEORGE S. TAKAMOTO,
BY
*Kimmel, Crowell & Weaver*
ATTORNEYS.

United States Patent Office 3,465,468
Patented Sept. 9, 1969

3,465,468
RADIANT ENERGY INSECT TRAP
George S. Takamoto, 347 N. Township Road,
Yuba City, Calif. 95991
Filed Apr. 28, 1967, Ser. No. 634,752
Int. Cl. A01m 1/04, 1/08
U.S. Cl. 43—113                                                                                                         1 Claim

ABSTRACT OF THE DISCLOSURE

An insect trap having an elongate vertically oriented ultraviolet lamp supported by three vanes extending radially therefrom and brackets at each end above a funnel and a collection vessel below the funnel for collecting insects which are attracted to the lamp and directed downwardly to the funnel to the collection vessel.

BACKGROUND OF THE INVENTION

Field of the invention

This invention relates to insect traps and more particularly to insect traps having radiant energy means such as an ultraviolet lamp for attracting insects to the trap and for collecting insects so attracted.

Description of the prior art

It is known in the prior art to attract insects by use of attractive poisons, attractive viscous liquids, and lights. The prior art discloses the use of lights for attracting insects but such devices as are known have not met with general acceptance because of their inefficiency and ineffectiveness or because they are unduly complicated and expensive. The object of this invention is to provide a highly simplified, highly effective insect trap utilizing ultraviolet frequency radiant energy for attracting insects.

SUMMARY

The object of this invention is to provide an over-all simplified insect trap which comprises a vertically oriented elongate ultraviolet lamp, a bracket mounting the lamp at each end thereof, a plurality of vanes extending radially from a central area, said vanes being secured at each end thereof by the brackets for positioning the lamp in the central area, a funnel secured below the vanes and a collection vessel secured below the funnel.

An additional object is the provision of a novel collection system and collecting vessel.

Other objects will appear from the specification which follows and from the drawings to which reference is now made.

DESCRIPTION OF THE PREFERRED EMBODIMENTS

Figure 1:
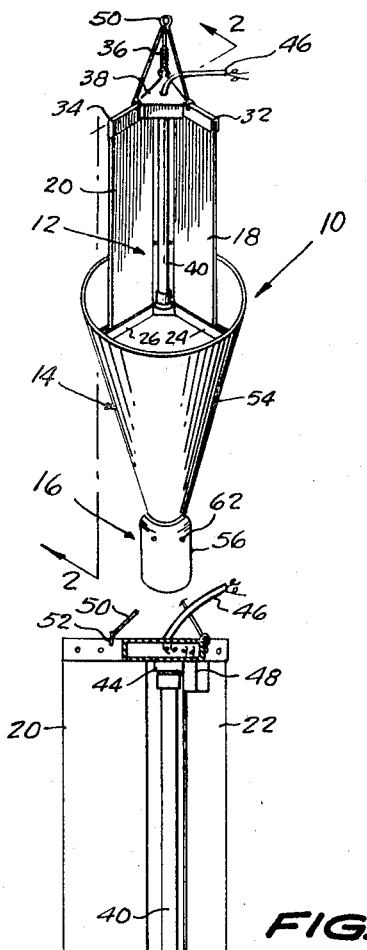
FIGURE 1 is a side elevational view of the insect trap of this invention.
Figure 2:
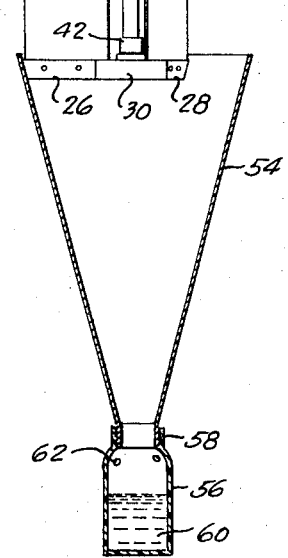
FIGURE 2 is a side elevational view in partial cross-section and in large scale showing the insect trap as shown in FIGURE 1.

With reference now first to FIGURES 1 and 2, it will be seen that the insect trap 10 of this invention comprises three basic units, the insect attracting unit 12, the insect directing unit 14, and the insect collecting unit 16.

The insect collecting assembly includes three vanes 18, 20, and 22, the latter being best shown in FIGURE 2, secured by means of a lower bracket including arms 24, 26, and 28 and a central portion 30, and an upper bracket including arms 32, 34, and 36 and a central portion 38. An elongate lamp 40 is disposed centrally of the vanes which extend radially therefrom. The vanes and the brackets form a frame for supporting the elongate lamp 40. The elongate lamp 40 is of the type generally referred to as "blacklight" lamps. This type of lamp is made by coating the tube with a special phosphor which produces radiation in the near ultraviolet region, between about 3,000 angstroms and about 4,000 angstroms and generally have a peak of about 3,500 angstroms. Such lamps are well known in the prior art for utilization in many different applications; therefore, additional description is not deemed necessary.

An electrical receiving fixture 42 is secured at the bottom to bracket 30 and another electrical fixture 44 is secured to the upper bracket 38. Power is received from an input wire 46 and the conventional ballast 48 of the type used with fluorescent lamps.

A hanger 50 which includes three wires secured to apertures 52 is provided as shown in FIGURE 1 and in FIGURE 2.

Secured to arms 24, 26 and 28 and disposed below lamp 40 is a funnel or funnel-like member 54 for directing the attracted insects downwardly into a collection vessel 56 which is threadably secured as at 58 to the bottom of funnel 54. A liquid such as water, a heavy viscous liquid, an insect attractive liquid or a poisonous liquid 60 may be contained in the collection vessel 56. A novel feature of the collection vessel is the provision of a plurality of apertures 62 in the upper portion thereof to permit drainage of the vessel if a sudden rain should arise to overfill the vessel.

Thus, it is seen that a single apparatus which may conveniently be hung from any overhanging member such as a limb or a rafter has been provided for the attraction and collection of insects.

Figure 3:
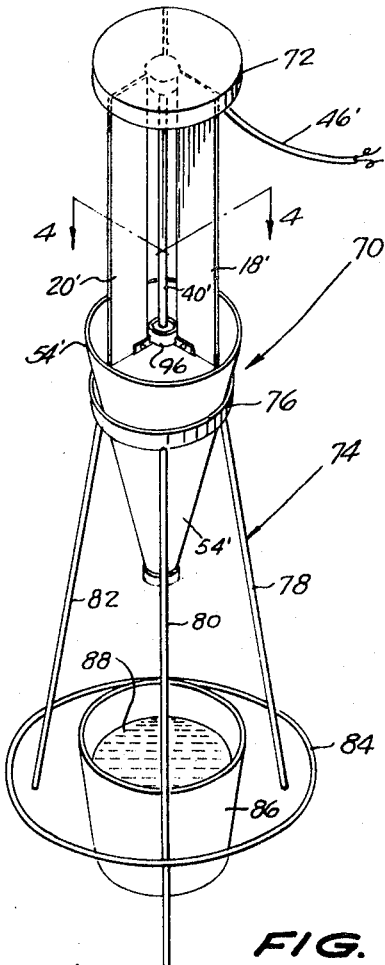
FIGURE 3 is an alternative embodiment of the insect trap of FIGURE 1 showing modified means for supporting the trap.
Figure 4:
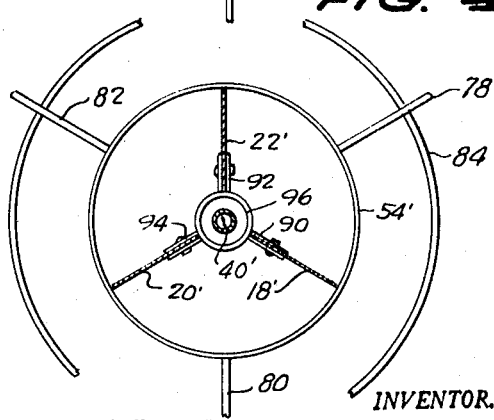
FIGURE 4 is a top view in partial cross-section showing the disposition of the collection vessel and the funnel in the insect trap of FIGURE 3.

For use where there is no overhanging member or for outside use generally, an alternative embodiment of the invention is shown in FIGURES 3 and 4 to which reference is now made.

In this embodiment, a lamp 40' of the type previously described is surrounded by radiating vanes 18', 20', and 22' and are secured at their outer edges to a funnel member 54'. Power is supplied as before by an input cord 46'. In this embodiment, however, the insect trap 70 includes a cover member 72 which may be of such a size as to prevent entry of rain into the funnel member 54'. The entire upper assembly including the insect attracting means and the funnel means are supported by means of a tripod 74 above a surface. The tripod 74 includes a ring 76 for receiving the funnel 54', legs 78, 80 and 82 and a support or brace ring 84 for stabilizing the tripod. The collection vessel 86 including a liquid 88 is disposed on the surface below the bottom of funnel 54'.

In this embodiment, the top and bottom brackets include three arms 90, 92 and 94 secured to a central portion 96 and the outer edges of the vanes 18', 20' and 22' are secured to the upper portion of funnel member 54'. The upper brackets support the cover member 72.

It will be seen that the invention as shown in FIGURES 3 and 4 is highly portable and may be supported by any desired surface.

It will be understood that while the invention has been disclosed with reference to specific embodiments that the invention is not limited to the specific constructions disclosed by may include departures therefrom without departing from the spirit of the invention.

I claim:
1. A radiant energy insect trap which comprises the combination of:
- a elongate lamp, said lamp producing radiant energy in the near ultraviolet spectrum when energized;
- a frame for supporting the lamp substantially vertically, said frame comprising;
- brackets at each end of and supporting said lamp; and
- a plurality of radially equispaced vertical generally rectangular planar vanes extending radially from the lamp and each secured at each end to the brackets;
- a funnel-like member disposed below the lamp and having its upper edge secured to the lower outer corners of said vanes, said member being adapted for directing insects attracted to the lamp downwardly therefrom to a central collection point;
- a ring encompassing and supporting said member at a point spaced below the top edge thereof;
- a plurality of legs secured to said ring and depending therefrom to support said ring from a surface;
- a second ring secured to said legs adjacent the lower ends thereof;
- a collection vessel disposed at the bottom of the funnel-like member within said second ring for containing a liquid and receiving insects from the funnel-like member; and
- a cover secured to the bracket supporting the upper end of said lamp for preventing rain from entering the trap.

References Cited

UNITED STATES PATENTS

| | | | |
|---|---|---|---|
| 1,783,631 | 12/1930 | Sladky | 43—107 |
| 1,787,421 | 12/1930 | Ruddell | 43—107 |
| 1,968,953 | 8/1934 | Metzger | 43—107 |
| 2,020,283 | 11/1935 | Armstrong et al. | 43—107 |
| 2,095,986 | 10/1937 | Koike | 43—113 |
| 2,113,409 | 4/1938 | Niemeyer | 43—113 |
| 2,715,295 | 8/1955 | Brown | 43—107 |
| 2,791,864 | 5/1957 | Chappell | 43—113 |
| 3,123,933 | 3/1964 | Roche | 43—139 |
| 3,321,862 | 5/1967 | Peek | 43—112 |
| 3,336,694 | 8/1967 | O'Connell | 43—113 |
| 3,348,332 | 10/1967 | O'Connell et al. | 43—113 |

ALDRICH F. MEDBERY, Primary Examiner